(12) United States Patent
Yamakawa

(10) Patent No.: US 11,457,267 B2
(45) Date of Patent: Sep. 27, 2022

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Yuichi Yamakawa, Inzai (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 16/433,908

(22) Filed: Jun. 6, 2019

(65) Prior Publication Data

US 2019/0394519 A1 Dec. 26, 2019

(30) Foreign Application Priority Data

Jun. 20, 2018 (JP) .............................. JP2018-116884

(51) Int. Cl.
| | |
|---|---|
| H04N 21/43 | (2011.01) |
| H04N 21/4363 | (2011.01) |
| H04N 21/845 | (2011.01) |
| G06F 3/14 | (2006.01) |

(52) U.S. Cl.
CPC ..... *H04N 21/43076* (2020.08); *G06F 3/1454* (2013.01); *H04N 21/4307* (2013.01); *H04N 21/43637* (2013.01); *H04N 21/8455* (2013.01)

(58) Field of Classification Search
CPC ......... H04N 21/4307; H04N 21/43637; H04N 21/8455; H04L 65/604; G06F 3/1454
See application file for complete search history.

(56) References Cited

U.S. PATENT DOCUMENTS

| | | | |
|---|---|---|---|
| 4,192,971 A | 3/1980 | Morigami et al. | |
| 6,236,468 B1 | 5/2001 | Otsuka et al. | |
| 6,799,214 B1 | 9/2004 | Li | |
| 8,090,765 B2 | 1/2012 | Yoo et al. | |
| 8,825,830 B2 | 9/2014 | Newton et al. | |
| 9,285,955 B2 | 3/2016 | Nezu et al. | |
| 10,560,499 B2 | 2/2020 | Vu et al. | |
| 2002/0051081 A1 | 7/2002 | Hori et al. | |
| 2006/0161854 A1 | 7/2006 | Kim et al. | |
| 2009/0109813 A1* | 4/2009 | Nishikawa | G11B 27/105 369/47.1 |
| 2009/0240427 A1 | 9/2009 | Siereveld et al. | |
| 2011/0051020 A1 | 3/2011 | Kotani et al. | |

(Continued)

FOREIGN PATENT DOCUMENTS

| | | |
|---|---|---|
| JP | 2014-131113 A | 7/2014 |
| JP | 2016-71638 A | 5/2016 |
| JP | 2018-514129 A | 5/2018 |

*Primary Examiner* — Pinkal R Chokshi
(74) *Attorney, Agent, or Firm* — Canon U.S.A., Inc. IP Division

(57) ABSTRACT

In a case where another communication apparatus is reproducing a content stored in an external apparatus, a communication apparatus receives an instruction to obtain the content from the external apparatus and reproduce the content and a reproduction position of the content being reproduced by the another communication apparatus from the another communication apparatus. The communication apparatus controls reproducing of the content to start from a position at a subsequent time from the received reproduction position, based on time taken for a reproduction preparation for the content.

22 Claims, 6 Drawing Sheets

(56) References Cited

U.S. PATENT DOCUMENTS

| | | | |
|---|---|---|---|
| 2012/0307146 A1* | 12/2012 | Watanuki | G11B 27/10 348/500 |
| 2014/0012898 A1* | 1/2014 | Mittal | G06F 16/957 709/203 |
| 2014/0173025 A1 | 6/2014 | Killick | |
| 2014/0207911 A1 | 7/2014 | Kosmach et al. | |
| 2014/0297720 A1 | 10/2014 | Lim et al. | |
| 2014/0342670 A1 | 11/2014 | Kang et al. | |
| 2014/0355763 A1 | 12/2014 | Lee et al. | |
| 2015/0086174 A1* | 3/2015 | Abecassis | H04N 21/4758 386/201 |
| 2015/0117340 A1 | 4/2015 | Kawakami | |
| 2015/0195147 A1 | 7/2015 | Jee et al. | |
| 2015/0257129 A1 | 9/2015 | Yoon | |
| 2015/0358666 A1* | 12/2015 | Atake | H04N 21/4396 725/88 |
| 2016/0034245 A1* | 2/2016 | Karunakaran | G06F 3/1407 345/2.2 |
| 2016/0094648 A1 | 3/2016 | Han et al. | |
| 2016/0135233 A1 | 5/2016 | Fujita | |
| 2016/0173937 A1* | 6/2016 | Shih | H04N 21/436 725/37 |
| 2016/0173939 A1 | 6/2016 | Iwami et al. | |
| 2016/0192259 A1 | 6/2016 | Ogawara | |
| 2016/0286239 A1 | 9/2016 | Sato | |
| 2016/0337689 A1 | 11/2016 | Yoshimura et al. | |
| 2016/0366468 A1* | 12/2016 | Seo | G06F 3/04842 |
| 2017/0006117 A1 | 1/2017 | Kafle et al. | |
| 2017/0078740 A1 | 3/2017 | Iwami et al. | |
| 2017/0085938 A1* | 3/2017 | Yeom | H04N 21/43637 |
| 2017/0237930 A1* | 8/2017 | Kim | H04N 21/47217 348/554 |
| 2018/0070122 A1* | 3/2018 | Baek | H04N 21/440263 |
| 2018/0095656 A1* | 4/2018 | Ingah | H04N 21/42208 |
| 2018/0124719 A1 | 5/2018 | Kim et al. | |
| 2018/0152827 A1* | 5/2018 | Perez | H04L 65/1083 |
| 2018/0262801 A1* | 9/2018 | Park | H04N 21/6587 |
| 2019/0068701 A1 | 2/2019 | Han | |
| 2019/0222885 A1 | 7/2019 | Cho et al. | |
| 2020/0053417 A1* | 2/2020 | Choi | H04N 21/41407 |

\* cited by examiner

COMMUNICATION APPARATUS, COMMUNICATION METHOD, AND STORAGE MEDIUM

BACKGROUND OF THE INVENTION

Field of the Invention

The present invention relates to reproduction of content by a communication apparatus.

Description of the Related Art

Some communication apparatus have a function capable of sharing a screen being displayed and sound being reproduced with another communication apparatus. Image data and audio data are transmitted to the communication apparatus as information about a screen being displayed and sound being reproduced by another communication apparatus, to share the screen being displayed and the sound being reproduced between the communication apparatus and another communication apparatus. In this operation, the communication apparatus reproduces the received image data and audio data in synchronization with another communication apparatus. Such a function is referred to as a mirroring function.

Some communication apparatuses have a function capable of obtaining a content from an external apparatus other than another communication apparatus and reproducing the content based on a reproduction instruction transmitted from another communication apparatus. Such a function is referred to as a content redirection function. By the content redirection function, the communication apparatus receives location information about the content stored in the external apparatus from another communication apparatus, obtains the content from the external apparatus based on the location information about the content, and reproduces the content.

Japanese Patent Application Laid-Open No. 2016-71638 discusses a communication apparatus that, when receiving an instruction to reproduce a content by content redirection from another communication apparatus that is reproducing a content and performing mirroring, receives a reproduction start position for content redirection along with the reproduction instruction.

Since the communication apparatus discussed in Japanese Patent Application Laid-Open No. 2016-71638 performs content reproduction preparation after receiving the reproduction instruction and then starts reproducing the content, there occurs a time difference between a timing of when another communication apparatus transmits the reproduction instruction and a timing of when the communication apparatus starts reproducing the content. In such a case, the communication apparatus starts to reproduce the content at the reproduction start position received with the reproduction instruction. If another communication apparatus continues reproducing the content even after the transmission of the reproduction instruction, another communication apparatus is then reproducing the content at a reproduction position ahead of that of the communication apparatus as much as the time difference that occurred. In other words, the communication apparatus reproduces the content at a reproduction position behind that of another communication apparatus as much as the time difference that occurred.

SUMMARY OF THE INVENTION

The present disclosure is directed to reducing a difference in reproduction positions between a communication apparatus that is reproducing a content stored in an external apparatus and a communication apparatus different from the foregoing communication apparatus that receives a reproduction instruction for the content from the foregoing communication apparatus and reproduces the content.

According to an aspect of the present disclosure, a communication apparatus include a first reception unit configured to receive, in a case where another communication apparatus is reproducing a content stored in an external apparatus, an instruction and information from the another communication apparatus, the instruction being intended to cause the communication apparatus to obtain the content from the external apparatus and to reproduce the content, the information indicating a reproduction position of the content being reproduced by the another communication apparatus, a preparation unit configured to perform a reproduction preparation for the content, based on reception of the instruction by the first reception unit, and a control unit configured to control reproducing of the content to start from a reproduction position at a subsequent time from the reproduction position received by the first reception unit, based on time taken for the reproduction preparation.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. Configurations described in the following exemplary embodiments are just examples, and the present disclosure is not limited to the configurations illustrated in the diagrams.

Figure 1:
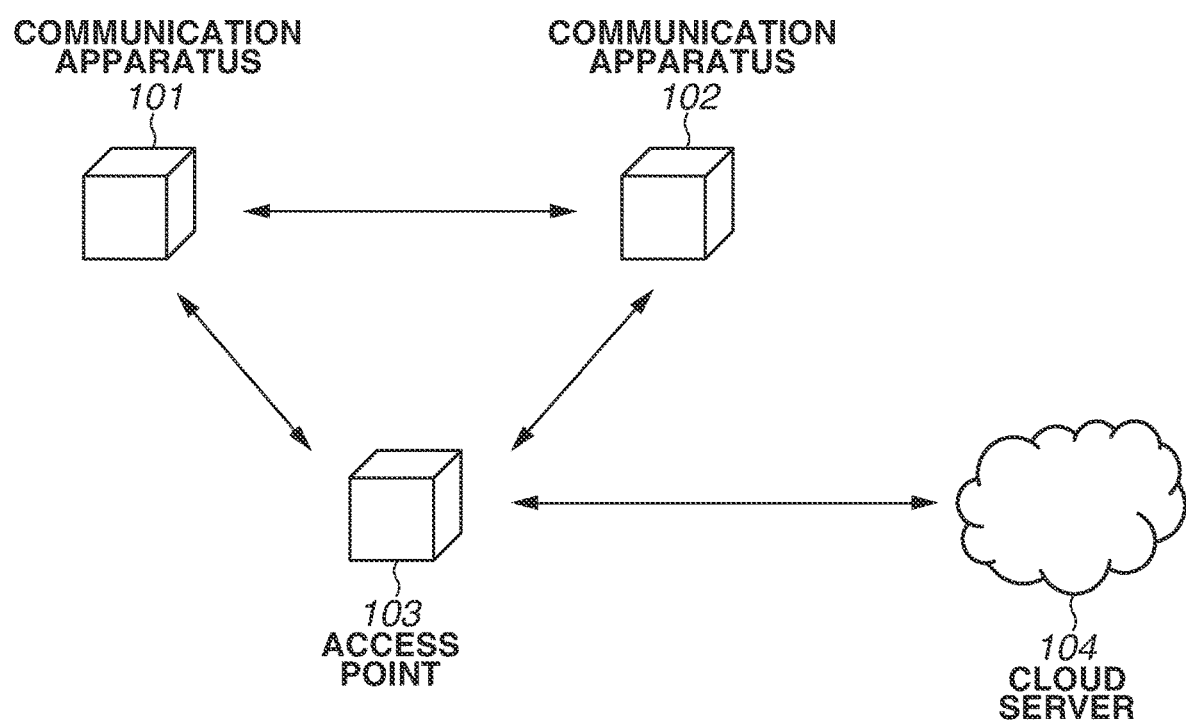
FIG. 1 is a diagram illustrating a network configuration of a communication system in which a communication apparatus participates.

FIG. 1 is a diagram illustrating a network configuration of a communication system in which a communication apparatus 102 according to the present exemplary embodiment participates. A communication apparatus 101 and the communication apparatus 102 can perform wireless communication compliant with the Wi-Fi Direct standard, for example. In such a case, the communication apparatuses 101 and 102 directly perform wireless communication without the intervention of an access point (AP) 103. The communication apparatuses 101 and 102 may also perform wireless communication via the AP 103 on an infrastructure network compliant with the Institute of Electrical and Electronics Engineers (IEEE) 802.11 series standard.

The communication apparatuses 101 and 102 can each communicate with a cloud server 104 via the AP 103. The communication apparatuses 101 and 102 can each obtain a content from the cloud server 104 and reproduce the content. According to the present exemplary embodiment, the content includes any one of image data, audio data, moving image data, and video data. The video data refers to data including both audio data and moving image data. The content may also include at least any one of software data, graphical user interface (GUI) data, and metadata for reproducing the foregoing data.

According to the present exemplary embodiment, the communication apparatuses 101 and 102 have a mirroring function. By mirroring, the communication apparatus 101 (source device) shares a screen being displayed and sound being reproduced by the communication apparatus 101 with the communication apparatus 102 (sink device). Specifically, the communication apparatus 101 transmits a stream of image data and audio data to the communication apparatus 102 as information about the screen being displayed and the sound being reproduced by the communication apparatus 101. The image data is obtained by encoding the screen being displayed by the communication apparatus 101. The audio data is obtained by encoding the sound being reproduced by the communication apparatus 101. Receiving the stream of the image data and the audio data, the communication apparatus 102 reproduces the received data in synchronization with the communication apparatus 101. For example, the communication apparatuses 101 and 102 perform mirroring compliant with the Wi-Fi Miracast standard to transmit and receive the stream via wireless communication compliant with the Wi-Fi Direct standard or via the infrastructure network. The communication apparatus 101 can share at least either one of the screen being displayed and the sound being reproduced with the communication apparatus 102. If the communication apparatus 101 does not share sound by mirroring, the communication apparatus 101 does not transmit audio data to the communication apparatus 102. If the communication apparatus 101 does not share a screen by mirroring, the communication apparatus 101 does not transmit image data to the communication apparatus 102.

The communication apparatuses 101 and 102 have a content redirection function in addition to the mirroring function. By content redirection, the communication apparatus 101 causes the communication apparatus 102 to obtain a content from an external apparatus other than the communication apparatus 101, and causes the communication apparatus 102 to reproduce the obtained content. An example of the external apparatus is the cloud server 104. Specifically, the communication apparatuses 101 and 102 perform wireless communication compliant with the Wi-Fi Direct standard, and the communication apparatus 101 transmits a reproduction instruction to the communication apparatus 102 to cause the communication apparatus 102 to reproduce the content. Alternatively, the communication apparatuses 101 and 102 may perform similar processing by performing wireless communication via an infrastructure network.

The reproduction instruction transmitted from the communication apparatus 101 to the communication apparatus 102 includes relevant information about the content. The communication apparatus 102 obtains the content from the external apparatus based on the relevant information about the content, included in the received reproduction instruction, and reproduces the content. Examples of the relevant information about the content include, for example, an identifier for identifying the content, a service name for identifying a service to be used in reproducing the content, and location information (Uniform Resource Identifier (URI) or Uniform Resource Locator (URL)) about the content. The relevant information about the content may be part of such information. The identifier of the content refers to an identifier for uniquely determining the content. The location information about the content refers to information indicating the storage location where the content is stored in the external apparatus. For example, the communication apparatuses 101 and 102 perform content redirection compliant with the Wi-Fi Miracast standard.

Specific examples of the communication apparatus 101 include, but not limited to, a tablet, a smartphone, a personal computer (PC), a mobile phone, a camera, and a video camera. Alternatively, the communication apparatus 101 may be any communication apparatus that can cause a different communication apparatus to obtain a content stored in an external apparatus and to reproduce the content by transmitting relevant information about the content to the different communication apparatus.

Specific examples of the communication apparatus 102 include a tablet, a smartphone, a PC, a mobile phone, a television set, a television adapter, a set top box, and a head-mounted display. Other specific examples of the communication apparatus 102 include a projector, a display, and a car navigation apparatus. Such examples are not restrictive. The communication apparatus 102 may be any communication apparatus that can obtain a content from an external apparatus based on relevant information received from the communication apparatus 101, and reproduce the content.

According to the present exemplary embodiment, if the communication apparatuses 101 and 102 are performing mirroring and the communication apparatus 101 is reproducing a content, content redirection is started to cause the communication apparatus 102 to reproduce the content that has been reproduced by the communication apparatus 101. When the communication apparatus 102 receives a reproduction instruction for the content from the communication apparatus 101, the communication apparatus 102 obtains the content from the external apparatus and performs preparation for reproduction. Specifically, as reproduction preparation for the content, the communication apparatus 102 activates an application, initializes at least either one of an image decoder and an audio decoder, and performs login authentication on a website or service providing the content. The communication apparatus 102 starts reproducing the content after the reproduction preparation for the content is completed. This causes a time difference between when the communication apparatus 101 transmits the reproduction instruction and when the communication apparatus 102 starts to reproduce the content.

If the communication apparatus 102 starts to reproduce the content by using a reproduction position received with the reproduction instruction as a reproduction start position, there occurs a difference in the reproduction position of the content between the communication apparatuses 101 and 102. The reproduction start position refers to the reproduction position of the content when the communication apparatus 102 starts to reproduce the content.

According to the present exemplary embodiment, the communication apparatus 102 starts to reproduce the content at a reproduction start position based on an elapsed time including the time taken for the reproduction preparation for the content and the reproduction position received with the reproduction instruction. The difference in the reproduction position occurring between the communication apparatuses 101 and 102 may be reduced. This can also reduce the portion of the content that the communication apparatus 102 reproduces by content redirection in an overlapping manner with the communication apparatus 101, whereby the user's sense of incongruity may be reduced.

After the reproduction preparation for the content, the communication apparatus 102 suspends the mirroring with the communication apparatus 101 and then starts reproducing the content by content redirection. The communication apparatus 102 can thus reduce the difference in the reproduction position, occurring between the communication apparatus 101 and 102 by using the time from the receipt of the reproduction instruction from the communication apparatus 101 to the suspension of the mirroring as the elapsed time. The communication apparatus 102 can also shorten the portion of the content reproduced in an overlapping manner with the communication apparatus 101. This can further reduce the user's sense of incongruity.

According to the present exemplary embodiment, the apparatuses of FIG. 1 perform wireless communication compliant with the IEEE 802.11 series standard. In addition, the apparatuses may use wireless communications compliant with other wireless communication methods such as Bluetooth®, near-field communication (NFC), ultra-wideband (UWB), ZigBee, and MultiBand orthogonal frequency division multiplexing (OFDM) Alliance (MBOA) communication methods. UWB includes Wireless Universal Serial Bus (USB), Wireless 1394, and WiNET. Communication methods compliant with wired communication methods such as a wireless local area network (LAN) may also be used.

According to the present exemplary embodiment, the communication apparatuses 101 and 102 use the Wi-Fi Miracast standard as a communication method for mirroring. However, this is not restrictive. Other communication methods such as Intel Wireless Display (WiDi) and Wireless High Definition (WirelessHD) may be used.

The communication apparatus 101 and 102 perform content redirection and mirroring via the network compliant with the Wi-Fi Direct standard or via the infrastructure network. In addition, the communication apparatus 101 and 102 can establish an application service platform (ASP) session via such networks, and perform content redirection and mirroring via the established ASP session.

Figure 2:
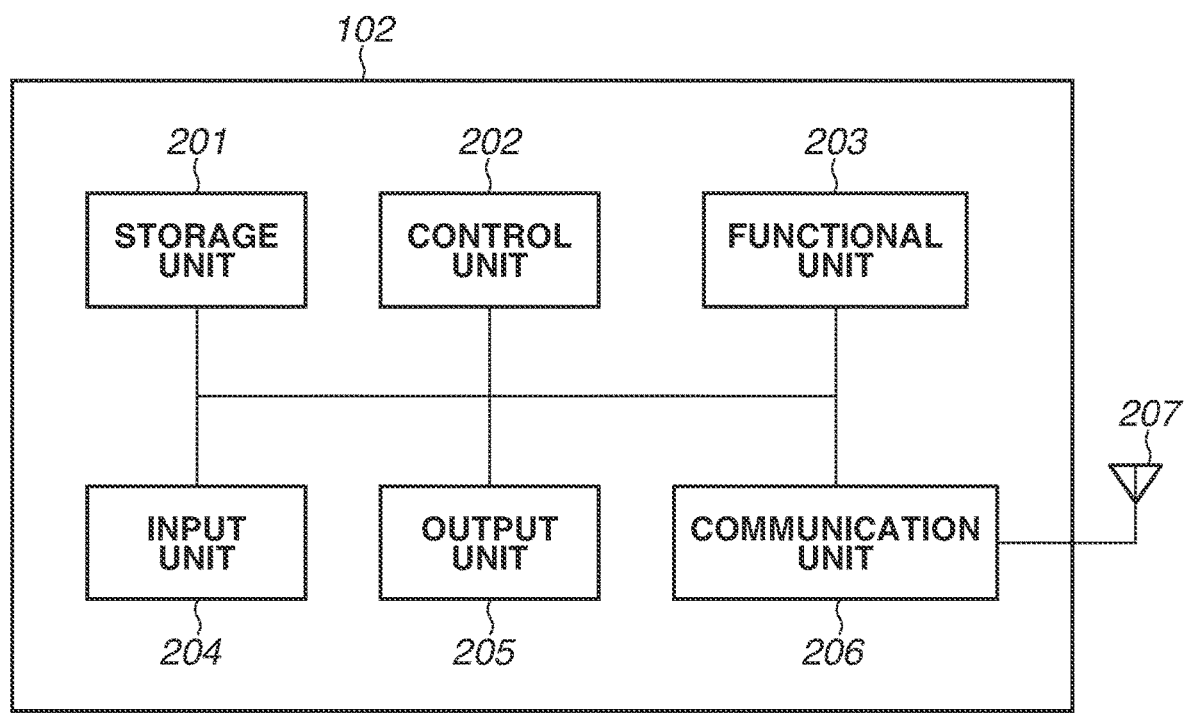
FIG. 2 is a diagram illustrating a hardware configuration of the communication apparatus.

FIG. 2 is a diagram illustrating a hardware configuration of the communication apparatus 102.

The communication apparatus 102 includes a storage unit 201, a control unit 202, a functional unit 203, an input unit 204, an output unit 205, a communication unit 206, and an antenna 207.

The storage unit 201 includes one or more memories such as a read-only memory (ROM) and a random access memory (RAM). The storage unit 201 stores a computer program for performing various operations to be described below and various types of information, such as a communication parameter for wireless communication. Aside from memories such as a ROM and a RAM, the storage unit 201 may use a storage medium, such as a flexible disk, a hard disk, an optical disc, a magneto-optical disc, a compact disc read-only memory (CD-ROM), a compact disc-recordable (CD-R), a magnetic tape, a nonvolatile memory card, and a digital versatile disc (DVD). The storage unit 201 may include a plurality of memories.

The control unit 202 includes one or more processors such as a central processing unit (CPU) and a microprocessing unit (MPU) which function as a computer. The control unit 202 controls the entire communication apparatus 102 by executing the computer program stored in the storage unit 201. The control unit 202 may control the entire communication apparatus 102 through cooperation of the computer program stored in the storage unit 201 and an operating system (OS). The control unit 202 may include a plurality of processors such as a multicore processor, and the entire communication apparatus 102 may be controlled by the plurality of processors.

The control unit 202 implements a mirroring function as a sink device by executing the computer program stored in the storage unit 201. The mirroring function as a sink device is a function of receiving captured and encoded image data on a screen being displayed by a source device and/or encoded audio data on sound being reproduced, and decoding and reproducing the received data. The control unit 202 also implements a content redirection function as a sink device by executing the computer program stored in the storage unit 201. The content redirection function as a sink device is a function of obtaining content to be reproduced from an external apparatus other than the source device based on information transmitted from the source device, and reproducing the content. By the content redirection function as a sink device, the communication apparatus 102 can further control the reproduction of the content on the own apparatus based on reproduction control information received from the source device.

The control unit 202 controls the functional unit 203 to perform predetermined processing, such as imaging and content browsing. The functional unit 203 is hardware for the communication apparatus 102 to perform the predetermined processing. For example, if the communication apparatus 102 is a camera, the functional unit 203 is an imaging unit and performs imaging processing.

The input unit 204 accepts various operations from the user. The output unit 205 provides various outputs to the user via a monitor screen and a speaker. The outputs of the output unit 205 may include a display on the monitor screen, an audio output from the speaker, and a vibration output. The monitor screen to which the output unit 205 performs an output refers to that of the communication apparatus 102. Alternatively, the monitor screen may be a monitor screen included in another apparatus connected to the communication apparatus 102. Both the input unit 204 and the output unit 205 may be implemented by a single module like a touch panel. By providing a display on the monitor screen, an audio output from the speaker, and/or a vibration output, the output unit 205 implements a function as a notification unit for making a notification to the user. The input unit 204 and the output unit 205 each may be either integrated with or separate from the communication apparatus 102. For example, the communication apparatus 102 may include hardware keys and/or a touch screen integrated with the communication apparatus 102 as the input unit 204. A remote controller separate from the communication apparatus 102 may be provided as the input unit 204. For example, the communication apparatus 102 may include a monitor screen or light source integrated with the communication apparatus 102 as the output unit 205. A display and a speaker separate from the communication apparatus 102 may be provided as the output unit 205.

The communication unit 206 controls wireless communication compliant with the IEEE 802.11 series, wired communication on a wired LAN, and Internet Protocol (IP) communication. The communication unit 206 transmits and receives wireless signals for wireless communication via the antenna 207. The communication apparatus 102 can also communicate a content, such as image data, document data, and video data, with the communication apparatus 101 via the communication unit 206.

The communication apparatus 101 has a similar hardware configuration to that of the communication apparatus 102. The control unit 202 of the communication apparatus 101 implements a mirroring function as a source device by executing a computer program stored in the storage unit 201. The mirroring function as a source device is a function of transmitting image data obtained by capturing and encoding a screen being displayed on the own apparatus and/or audio data obtained by encoding sound being reproduced to a sink device. The control unit 202 may implement a content redirection function as a source device by executing the computer program stored in the storage unit 201. The content redirection function as a source device is a function of transmitting information for a sink device to obtain a content to be reproduced by the sink device from an external apparatus other than the source device to the sink device. As the content redirection function as a source device, the communication apparatus 101 can also transmit reproduction control information for controlling the reproduction of the content being reproduced by the sink device to the sink device.

According to the present exemplary embodiment, the communication apparatuses 101 and 102 are apparatuses capable of both image display and sound reproduction. However, both the communication apparatuses 101 and 102 may be apparatuses only capable of either one of image display and sound reproduction.

Figure 3:
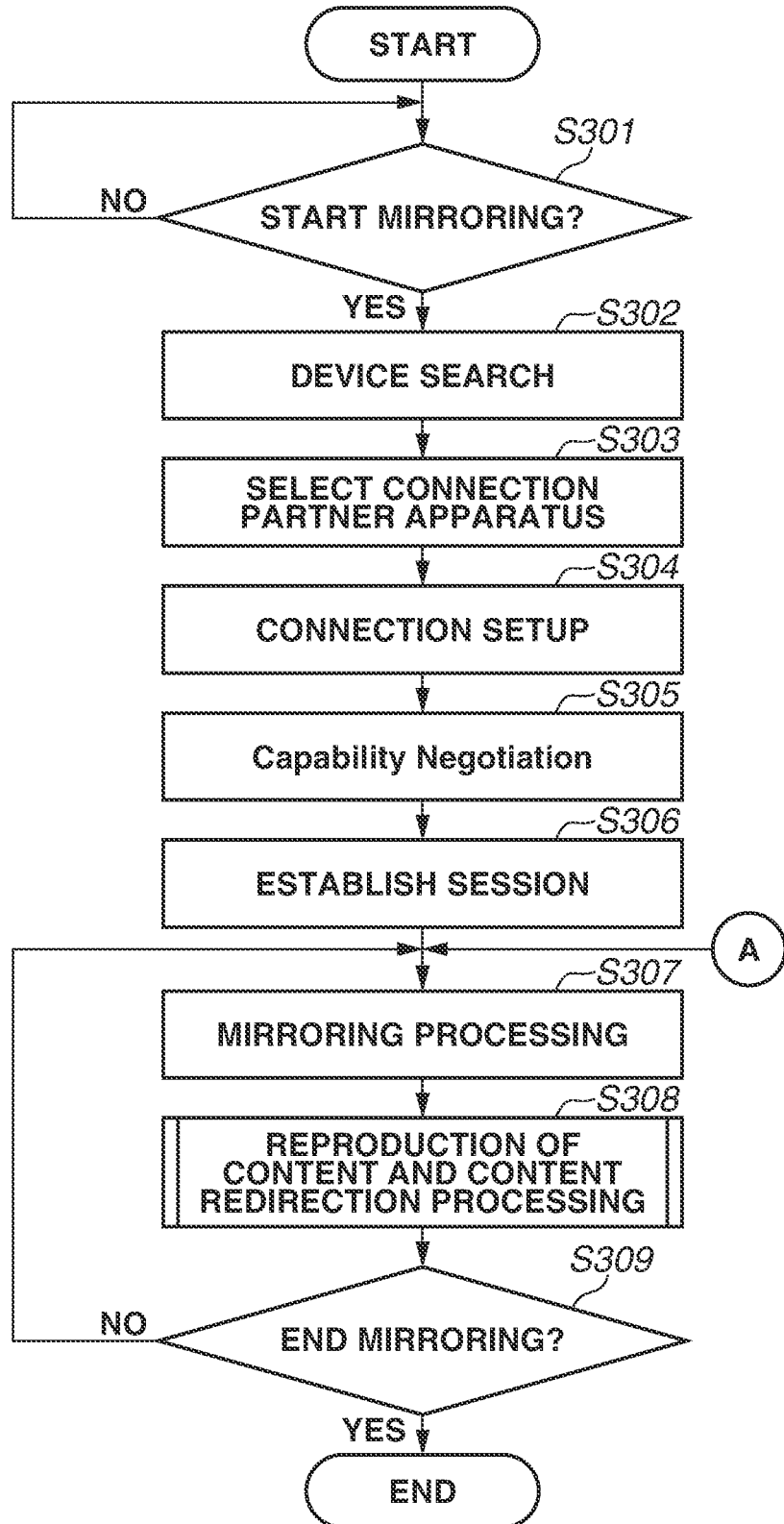
FIG. 3 is a flowchart illustrating processing to be executed by a communication apparatus in performing mirroring with another communication apparatus.
Figure 4:
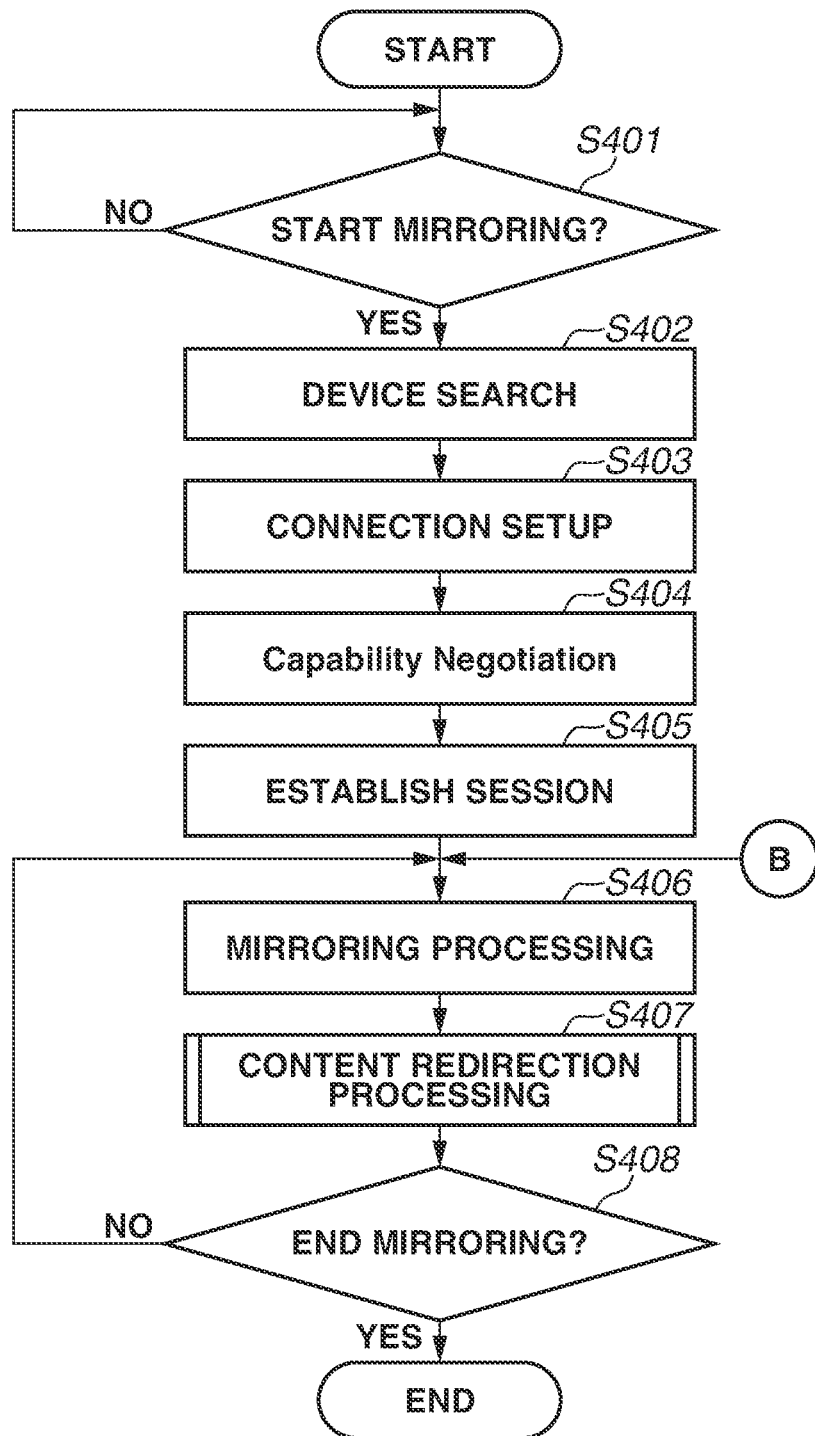
FIG. 4 is a flowchart illustrating processing to be executed by the communication apparatus in performing mirroring with another communication apparatus.

Processing to be executed by the communication apparatuses 101 and 102 in performing mirroring will be described with reference to FIGS. 3 and 4, respectively. FIG. 3 is a flowchart illustrating processing implemented by the control unit 202 of the communication apparatus 101 reading the computer program stored in the storage unit 201 and executing the computer program when the communication apparatus 101 performs mirroring with the communication apparatus 102. FIG. 4 is a flowchart illustrating processing implemented by the control unit 202 of the communication apparatus 102 reading the computer program stored in the storage unit 201 and executing the computer program when the communication apparatus 102 performs mirroring with the communication apparatus 101.

Step S301 of FIG. 3 is started by power-on of the communication apparatus 101. However, this is not restrictive. Step S301 may be started in response to activation of a predetermined application on the communication apparatus 101. Step S401 of FIG. 4 is started by power-on of the communication apparatus 102. However, this is not restrictive. Step S401 may be started in response to activation of a predetermined application on the communication apparatus 102.

In step S301, the communication apparatus 101 initially determines whether to start mirroring. The determination is performed based on whether a mirroring start operation is performed by the user via the input unit 204 of the communication apparatus 101. While the mirroring start operation refers to the user's pressing of a control button for starting mirroring, this is not restrictive. In the determination, the communication apparatus 101 may use user operations, such as a predetermined keyboard operation, mouse operation, touch operation, and joystick operation, as the start operation. Alternatively, the communication apparatus 101 may use user operations, such as a predetermined gesture, pressing of a control button on a remote controller, a start of reproduction of a predetermined content, and activation of a predetermined application, as the start operation. If no mirroring start operation is performed, the communication apparatus 101 determines to not start mirroring (NO in step S301) and the processing returns to step S301. Meanwhile, if a mirroring start operation is performed, the communication apparatus 101 determines to start mirroring (YES in step S301) and the processing proceeds to step S302.

The communication apparatus 101 is not limited to the mirroring start operation by the user, and may automatically start mirroring. For example, the communication apparatus 101 may start mirroring based on a lapse of a predetermined time from activation of a predetermined application or a start of reproduction of a predetermined content. The communication apparatus 101 may start mirroring based on recognition of a predetermined image or a predetermined person via the input unit 204.

Similarly, in step S401, the communication apparatus 102 determines whether to start mirroring. The determination is performed in a similar manner to that of step S301. If the communication apparatus 102 determines to not start mirroring (NO in step S401), the processing returns to step S401. Meanwhile, if the communication apparatus 102 determines to start mirroring (YES in step S401), the processing proceeds to step S402.

In steps S302 and S402, the communication apparatuses 101 and 102 perform a device search therebetween. The communication apparatuses 101 and 102 search for a device to perform mirroring with via wireless communication compliant with the Wi-Fi Direct standard or via the infrastructure network.

If the communication apparatuses 101 and 102 search for a device to perform mirroring with by the method compliant with the Wi-Fi Direct standard, the processing of steps S302 to S304 and steps S402 to S403 is performed in the following manner. Specifically, the communication apparatus 101 initially transmits a Probe Request compliant with the IEEE 802.11 series standard as a device discovery request. The communication apparatus 102 transmits a Probe Response as a response. The communication apparatuses 101 and 102 thereby discover each other. The apparatuses to transmit the Probe Request and Probe Response may be reversed.

The communication apparatus 102 may perform the determination of step S401 based on whether a wireless signal intended for a device search is received from the communication apparatus 101. For example, the communication apparatus 102 may perform a determination of YES in step S401 in response to receipt of the Probe Request as the wireless signal intended for a device search from the communication apparatus 101.

The communication apparatus 101 displays a list of discovered devices on the monitor screen that is the output unit 205. The user selects a device to perform mirroring with from the list of devices displayed on the monitor screen of the communication apparatus 101. In step S303, the communication apparatus 101 selects the user-selected device as a connection partner apparatus to perform mirroring. In this step, the communication apparatus 101 may select the connection partner apparatus based on a history of devices with which mirroring has been performed in the past. Specifically, if the discovered devices include a device with which mirroring has been performed in the past, the communication apparatus 101 selects the device as the connection partner apparatus. Alternatively, the communication apparatus 101 may select a device at the closest distance to the communication apparatus 101 from among the discovered devices as the connection partner apparatus. The communication apparatus 101 may select a device of the highest communication quality as the connection partner apparatus. The selection of the connection partner apparatus in step S303 may be performed by the communication apparatus 102.

In the flowchart according to the present exemplary embodiment, the Probe Request and Probe Response are used for the device search. However, a Beacon or other wireless signals compliant with the IEEE 802.11 series standard may be used based on the Wi-Fi Miracast standard. The communication apparatus 101 or 102 may perform a device search by using NFC, a Quick Response (QR) code®, or Bluetooth® Low Energy. For example, if the communication apparatus 101 has an NFC communication function, the communication apparatuses 101 and 102 may be paired by an NFC touch operation, and the subsequent communication can be performed based on the Wi-Fi Miracast standard.

Before the processing of steps S304 and S403, the communication apparatuses 101 and 102 may perform a service search compliant with the Wi-Fi Direct standard. By performing the service search, at least either one of the communication apparatuses 101 and 102 can obtain information about a service or services provided by the other apparatus.

In step S304, the communication apparatus 101 performs a connection setup with the connection partner apparatus selected in step S303. According to the present exemplary embodiment, the communication apparatus 102 is selected as the connection partner apparatus in step S303. In step S403, the communication apparatus 102 therefore also performs a connection setup with the communication apparatus 101. Specifically, the communication apparatuses 101 and 102 perform Wi-Fi Miracast connection processing, and then perform Transmission Control Protocol (TCP) connection processing. The execution of such connection processing completes the connection setup between communication apparatuses 101 and 102.

Now, detailed procedures of steps S304 and S403 will be described. To determine a communication apparatus that serves as a group owner (GO) in charge of establishing a network in wireless communication compliant with the Wi-Fi Direct standard, the communication apparatus 101 transmits a GO Negotiation Request to the communication apparatus 102. This signal includes an Intent value indicating the degree of intention of the communication apparatus 101 to be a GO.

Receiving the GO Negotiation Request, the communication apparatus 102 transmits a GO Negotiation Response including the Intent value of the communication apparatus 102 as a response. Receiving the GO Negotiation Response, the communication apparatus 101 compares the Intent values of the communication apparatuses 101 and 102, and determines the communication apparatus having the greater Intent value as a GO. The communication apparatus having the smaller Intent value is determined as a client (CL), and serves a role participating in the network established by the GO.

The communication apparatus 101 transmits a GO Negotiation Confirm including the result of comparison of the Intent values to the communication apparatus 102. According to the present exemplary embodiment, the communication apparatus 101 has an Intent value greater than that of the communication apparatus 102, and the communication apparatus 101 serves as a GO and the communication apparatus 102 serves as a CL.

The communication apparatuses 101 and 102 then share parameter information for establishing a network connection therebetween, including connection- and security-related information, by using a Wi-Fi Protected Setup (WPS) method. Based on the exchanged parameter information, the communication apparatus 102 serving as a CL then transmits an Association Request to the communication apparatus 101 serving as a GO. Receiving this signal, the communication apparatus 101 transmits an Association Response as a response.

In such a manner, the communication apparatuses 101 and 102 complete the Wi-Fi Miracast connection processing compliant with the Wi-Fi Direct standard therebetween. While, according to the present exemplary embodiment, the communication apparatus 101 is the GO and the communication apparatus 102 is the CL, the roles may be reversed. The wireless signals transmitted by the GO may be transmitted by the CL instead. In such a case, the wireless signals transmitted by the CL are transmitted by the GO instead. In performing the Wi-Fi Miracast connection processing, the communication apparatuses 101 and 102 may use a Beacon message and a Reassociation aside from the foregoing wireless signals. The communication apparatus 101 and 102 may also use a Peer-to-peer (P2P) Invitation and a Provision Discovery.

The communication apparatus 101 and 102 then establish a TCP connection therebetween. The TCP connection is established by performing a three-way handshake while the communication apparatus 101 serves as a TCP server and the communication apparatus 102 serves as a TCP client.

In such a manner, the communication apparatus 101 and 102 complete the Wi-Fi Miracast connection processing and establish a TCP connection therebetween, whereby the connection setup is completed.

If the communication apparatus 101 and 102 search for a device to perform mirroring with via an infrastructure network, the processing of steps S302 to S304 and S402 to S403 is performed in the following manner.

A search for a device to perform mirroring with via an infrastructure network is performed by using a multicast domain name system (DNS) (mDNS). The communication apparatus 101 initially multicasts a DNS packet to other communication apparatuses participating in the infrastructure network via the connected AP 103. The communication apparatus 101 detects a mirroring-capable device by receiving a response from the device via the AP 103. Specifically, the communication apparatus 101 transmits a DNS packet including a DNS record via the AP 103. The DNS record indicates that the communication apparatus 101 is searching specifically for a communication apparatus capable of wireless communication compliant with the Wi-Fi Miracast standard. The DNS record includes either one of identifiers displaysrc and display, which indicate a source device and a sink device, respectively. Since the communication apparatus 101 searches for a sink device as a device to perform mirroring with, the DNS record includes the identifier display indicating a sink device. The communication apparatus 101 can transmit the DNS packet at arbitrary transmission intervals for an arbitrary number of times of transmission. In performing a device search, the communication apparatus 101 repeats the transmission of the DNS packet up to a predetermined number of times. Alternatively, the communication apparatus 101 may repeat the transmission of the DNS packet until a predetermined time elapses. The communication apparatus 101 may stop transmitting the DNS packet in response to receipt of responses from a predetermined number of other communication apparatuses.

After the search for a device to perform mirroring with via the infrastructure network, the communication apparatus 101 displays the search results and selects a connection partner apparatus. The display of the search results and the selection of the connection partner apparatus are performed in the same manner as in step S303.

The communication apparatus 101 then transmits an mDNS inquiry to the selected connection partner apparatus (here, the communication apparatus 102) via the AP 103. The mDNS inquiry transmitted here is a signal for inquiring capability information about the communication apparatus 102 and a port number and a hostname to be used for communication between the communication apparatuses 101 and 102. The capability information about the communication apparatus 102, inquired by the mDNS inquiry is information about whether the communication apparatus 102 is a sink device, a source device, or a dual-role device. Receiving the mDNS inquiry, the communication apparatus 102 transmits an mDNS response including the capability information about the own apparatus, the port number, and the hostname to the communication apparatus 101. Receiving the mDNS response, the communication apparatus 101 completes the connection setup with the communication apparatus 102. The communication apparatus 101 may establish a TCP connection by performing a three-way handshake with the communication apparatus 102.

Whether mirroring is performed via the network compliant with the Wi-Fi Direct standard or via the infrastructure network, the processing after the completion of the connection setup between the communication apparatuses 101 and 102 is the same.

In steps S305 and S404, the communication apparatuses 101 and 102 performs capability negotiation. In the Wi-Fi Miracast standard, the Real Time Streaming Protocol (RTSP) is defined to be used for capability negotiation. The RTSP is a protocol for streaming control. The TCP is typically used as a lower-layer transport protocol. For capability negotiation, the communication apparatuses 101 and 102 exchange predetermined messages RTSP M1 to M4. The communication apparatus 101 obtains the capability information about the communication apparatus 102 by the exchange of the RTSP messages, determines parameters to be used, and notifies the communication apparatus 102 of the parameters. The communication apparatus 102 sets the parameters notified by the communication apparatus 101. Specific examples of screen-related capability information include information about screen resolutions and frame rates supported by the communication apparatus 102. Specific examples of audio-related capability information include information about codecs and sampling frequencies supported by the communication apparatus 102. As a result of the capability negotiation, the types of image and audio coding schemes, the video resolution, and the frame rate to be used when the communication apparatuses 101 and 102 perform mirroring therebetween are determined. The capability information transmitted and received between the communication apparatuses 101 and 102 may be part of such information.

In steps S306 and S405, after the completion of the capability negotiation, the communication apparatuses 101 and 102 establish a session compliant with the Wi-Fi Miracast standard. To establish the session, the communication apparatuses 101 and 102 exchange predetermined messages RTSP M5 to M7 according to the Wi-Fi Miracast standard. The port number to be used between the communication apparatuses 101 and 102 is set and the session is established by the exchange of such RTSP messages.

In step S307, after the establishment of the session, the communication apparatus 101 starts mirroring processing as a source device. In this step, as the mirroring processing that is performed by a source device, the communication apparatus 101 captures the screen being displayed and performs encoding, multiplexing, and data transmission processing of the captured image. The communication apparatus 101 may perform encoding, multiplexing, and data transmission processing of sound being reproduced in addition to or instead of those of the captured image of the screen. The mirroring processing to be performed by the communication apparatus 101 may be part of such processing.

In step S406, the communication apparatus 102 starts mirroring processing as a sink device. In this step, as the mirroring processing that is performed by a sink device, the communication apparatus 102 performs data reception, demultiplexing, decoding of the captured image, and processing for reproducing the decoded captured image. If the communication apparatus 101 performs the mirroring processing of the sound being reproduced in addition to or instead of that of the captured image, the communication apparatus 102 may perform data reception, demultiplexing, and decoding of the audio data transmitted from the communication apparatus 101, and processing for reproducing the decoded audio data. The mirroring processing to be performed by the communication apparatus 102 may be part of such processing.

By the communication apparatus 101 and 102 performing the processing of steps S307 and S406, a stream of information about at least either one of the screen being displayed and the sound being reproduced by the communication apparatus 101 is transmitted to the communication apparatus 102. The communication apparatus 102 reproduces the stream transmitted from the communication apparatus 101, and thereby at least either displays the same screen or reproduces the same sound as the communication apparatus 101 does.

In step S308, the communication apparatus 101 performs the reproduction of content and content redirection processing. In step S407, the communication apparatus 102 performs content redirection processing. Details of the processing of steps S308 and S407 will be described below with reference to FIGS. 5 and 6, respectively.

After steps S308 and S407, the processing proceeds to steps S309 and S408, respectively. In steps S309 and S408, the communication apparatuses 101 and 102 determine whether to end mirroring. If the communication apparatuses 101 and 102 determine to not end mirroring (NO in step S309 and NO in step S408), the processing proceeds to steps S307 and S406, respectively. In steps S307 and S406, the communication apparatuses 101 and 102 perform the mirroring processing. Meanwhile, if the communication apparatuses 101 and 102 determine to end mirroring (YES in step S309 and YES in step S408), the processing of the flowcharts ends.

In FIG. 3, the communication apparatus 101 performs the processing of step S308 before performing the determination of step S309. However, this is not restrictive. The communication apparatus 101 may perform the determination of step S309 at any time after the mirroring processing is started in step S307. Similarly, in FIG. 4, the communication apparatus 102 performs the processing of step S407 before performing the determination of step S408. However, this is not restrictive. The communication apparatus 102 may perform the processing of step S408 at any time after the mirroring processing is started in step S406.

As described above, FIGS. 3 and 4 illustrate the processing to be executed by the communication apparatuses 101 and 102, respectively, when the communication apparatuses 101 and 102 perform mirroring.

Next, details of the processing of steps S308 and S407 will be described with reference to FIGS. 5 and 6, respectively.

Figure 5:
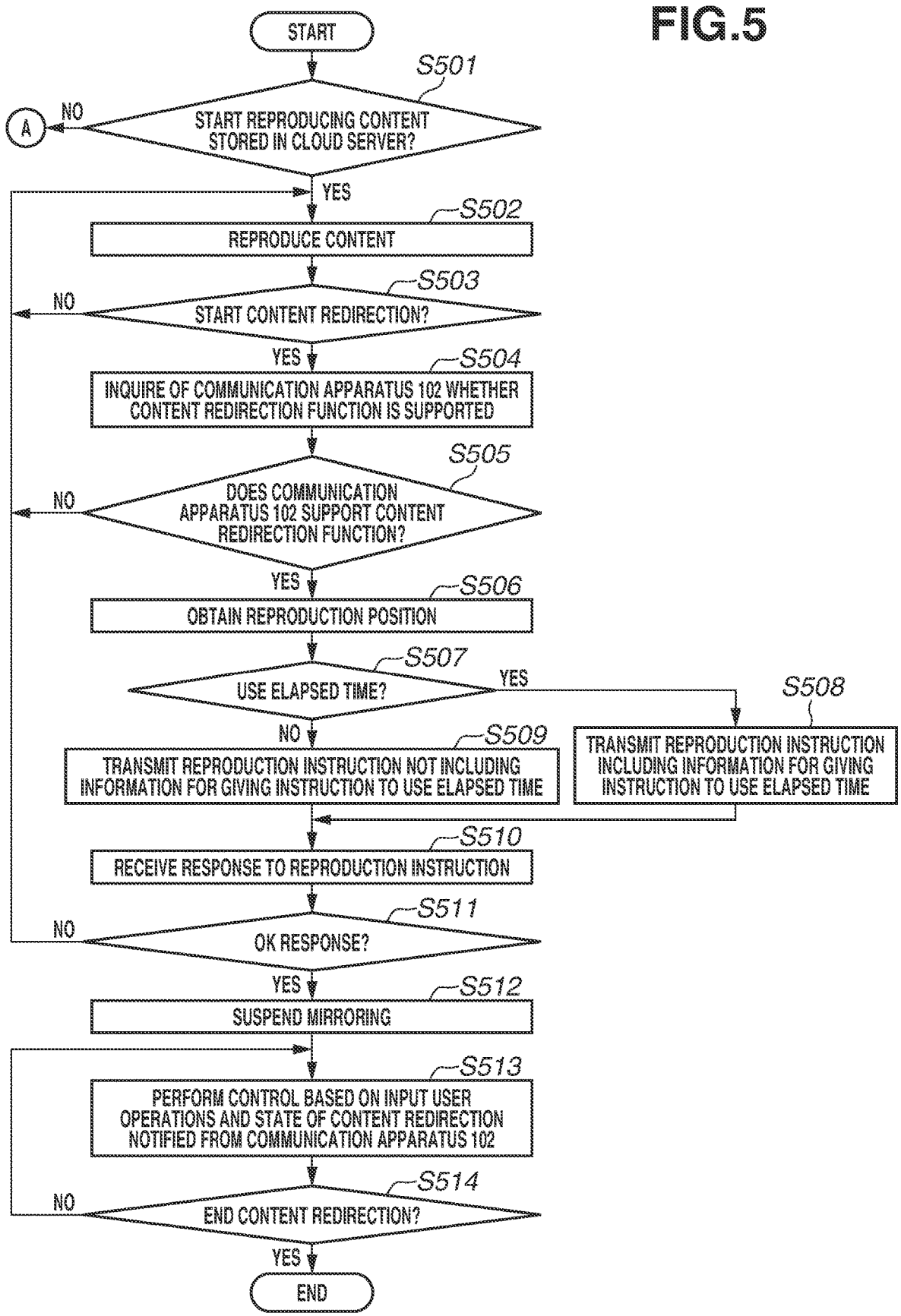
FIG. 5 is a flowchart illustrating processing to be executed by the communication apparatus in performing content redirection with another communication apparatus.

In step S501 of FIG. 5, the communication apparatus 101 determines whether to start reproducing a content stored in the cloud server 104. The determination is performed based on whether the user issues a reproduction instruction for the content stored in the cloud server 104. For example, the determination may be performed based on whether the user selects a thumbnail or icon of or a hyperlink to the content displayed on the screen of the communication apparatus 101. If the user issues a reproduction instruction for the content, the communication apparatus 101 determines to start reproducing the content (YES in step S501) and the processing proceeds to step S502. If the communication apparatus 101 automatically starts to reproduce a content on the cloud server 104, such as when a predetermined webpage is displayed and when a webpage is scrolled to a predetermined position, the communication apparatus 101 may perform a determination of YES in step S501. Meanwhile, if the user does not issue a reproduction instruction for the content, the communication apparatus 101 determines to not start reproducing a content (NO in step S501) and the processing proceeds to step S307 of FIG. 3.

If the communication apparatus 101 determines to start reproducing the content stored in the cloud server 104 (YES in step S501), the processing proceeds to step S502. In step S502, the communication apparatus 101 obtains the content from the cloud server 104 and reproduces the content. While obtaining the content from the cloud server 104 and reproducing the content, the communication apparatus 101 captures and encodes the image and/or sound output to the output unit 205, and transmits the resulting image data and/or audio data to the communication apparatus 102. The communication apparatus 101 thereby continues streaming at least either one of the screen and sound by mirroring.

In step S503, the communication apparatus 101 determines whether to start content redirection. The determination is performed based on whether the user issues a start instruction for content redirection. For example, the determination may be performed based on whether the user selects a software key for issuing an instruction to start content redirection, displayed on the screen of the communication apparatus 101. If the user does not issue a start instruction for content redirection, the communication apparatus 101 determines to not start content redirection (NO in step S503) and the processing returns to step S502. Meanwhile, if the user issues a start instruction for content redirection, the communication apparatus 101 determines to start content redirection (YES in step S503) and the processing proceeds to step S504.

The communication apparatus 101 may automatically start content redirection based on the processing load of the own apparatus and the status of wireless communication with the communication apparatus 102. For example, the communication apparatus 101 may measure the use rate of the control unit 202 in a predetermined period, and if an average use rate is higher than or equal to a predetermined value, start content redirection since the processing load of the own apparatus is high. For example, the communication apparatus 101 may measure the amount of data transmitted and received by the wireless communication with the communication apparatus 102 in a predetermined period, and if an average amount is greater than or equal to a predetermined value, start content redirection. For example, the communication apparatus 101 may start content redirection if the field intensity of the wireless communication with the communication apparatus 102 is lower than a predetermined value.

If the communication apparatus 101 determines to start content redirection (YES in step S503), the processing proceeds to step S504. In step S504, the communication apparatus 101 inquires of the communication apparatus 102 that is the sink device whether the communication apparatus 102 supports the content redirection function. The communication apparatus 101 can use a RTSP GET_PARAMETER message for the inquiry about the content redirection function.

Figure 6:
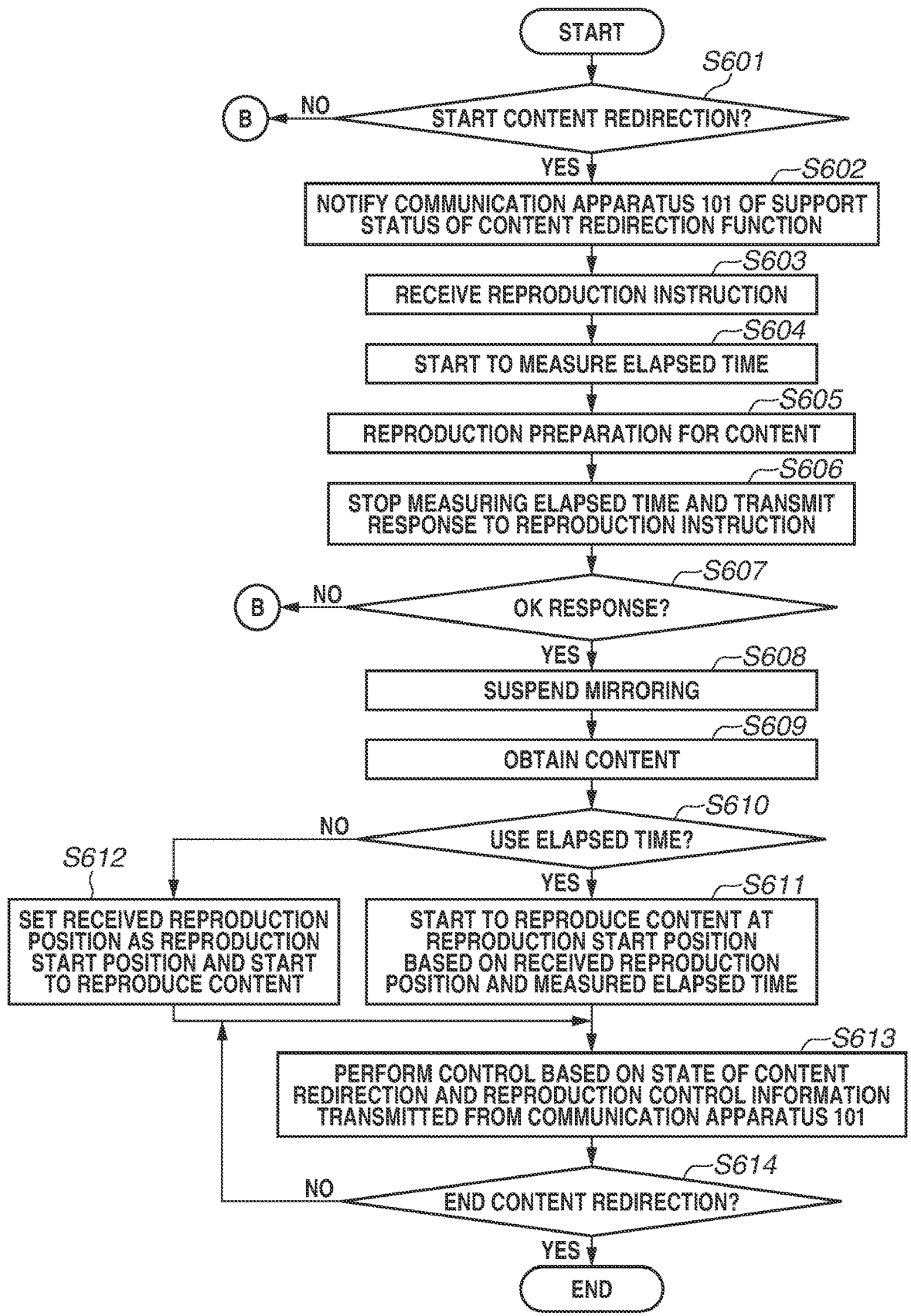
FIG. 6 is a flowchart illustrating processing to be executed by the communication apparatus in performing content redirection with another communication apparatus.

Meanwhile, in step S601 of FIG. 6, the communication apparatus 102 also determines whether to start content redirection. The determination is performed based on whether the inquiry about the content redirection function is received from the communication apparatus 101. If the inquiry about the content redirection function is not received from the communication apparatus 101, the communication apparatus 102 determines to not start content redirection (NO in step S601) and the processing proceeds to step S406 of FIG. 4. Meanwhile, if the inquiry about the content redirection function is received from the communication apparatus 101, the communication apparatus 102 determines to start content redirection (YES in step S601) and the processing proceeds to step S602.

In step S602, the communication apparatus 102 notifies the communication apparatus 101 of the support status of the content redirection function as a response to the received inquiry about the content redirection function. Specifically, the communication apparatus 102 notifies the communication apparatus 101 whether the content redirection function is supported. In addition to or instead of the information that the content redirection function is supported, the communication apparatus 102 may notify the communication apparatus 101 of information about a service that the communication apparatus 102 can use in reproducing a content by the content redirection function. For example, the communication apparatus 102 may notify the communication apparatus 101 of information such as a service name for identifying the service.

In step S505, the communication apparatus 101 determines whether the communication apparatus 102 supports the content redirection function based on the response transmitted from the communication apparatus 102 in step S602. If the communication apparatus 101 determines that the communication apparatus 102 does not support the content redirection function (NO in step S505), the processing returns to step S502. In such a case, at least either one of the communication apparatuses 101 and 102 may notify the user that the communication apparatus 102 does not support the content redirection function.

Meanwhile, if the communication apparatus 101 determines that the communication apparatus 102 supports the content redirection function (YES in step S505), the processing proceeds to step S506. In step S506, the communication apparatus 101 obtains the reproduction position of the content. Specifically, the communication apparatus 101 obtains the current reproduction position of the content being reproduced by the own apparatus. The processing proceeds to step S507. The reproduction position of the content is expressed by time information with the beginning of the content as a starting point (0.0 sec).

In step S507, the communication apparatus 101 determines whether to cause the communication apparatus 102 to use an elapsed time including time taken for reproduction preparation for the content when causing the communication apparatus 102 to start to reproduce the content. Specifically, the communication apparatus 101 determines whether to cause the communication apparatus 102 to reproduce the content from a reproduction start position taking into account the elapsed time including the time taken for reproduction preparation for the content when the communication apparatus 102 starts reproducing the content by content redirection. The communication apparatus 101 performs the determination based on whether a user operation for specifying a reproduction start position of the content is accepted when the start instruction for content redirection is issued by the user in step S503. If a user operation for specifying a reproduction start position of the content is accepted, the communication apparatus 101 determines to not cause the communication apparatus 102 to use the elapsed time (NO in step S507). Meanwhile, if a user operation for specifying a reproduction start position of the content is not accepted, the communication apparatus 101 determines to cause the communication apparatus 102 to use the elapsed time (YES in step S507). If a user operation for specifying a reproduction stat position is accepted from the user, the communication apparatus 101 determines to not cause the communication apparatus 102 to use the elapsed time so that the communication apparatus 102 can reproduce the content from the reproduction start position desired by the user when starting to reproduce the content. This improves the user convenience. Alternatively, if the communication apparatus 101 automatically switches from mirroring to content redirection, the communication apparatus 101 may determine to cause the communication apparatus 102 to use the elapsed time (YES in step S507).

The communication apparatus 101 may perform the determination of step S507 based on a setting of the communication apparatus 101 about the use of the elapsed time. If the communication apparatus 101 is set to cause the communication apparatus 102 to use the elapsed time, the communication apparatus 101 performs a determination of YES in step S507. If the communication apparatus 101 is set to not cause the communication apparatus 102 to use the elapsed time, the communication apparatus 101 performs a determination of NO in step S507. The setting about the elapsed time may be set by the user or preset in the communication apparatus 101.

If the communication apparatus 101 determines to cause the communication apparatus 102 to use the elapsed time (YES in step S507), the processing proceeds to step S508. In step S508, the communication apparatus 101 transmits a reproduction instruction including information for giving an instruction to use the elapsed time to the communication apparatus 102. The content that the communication apparatus 102 is instructed to reproduce in this step are the same as the content that the communication apparatus 101 is reproducing at this step. To transmit the reproduction instruction, the communication apparatus 101 may use an RTSP SET_PARAMETER message.

Meanwhile, if the communication apparatus 101 determines to not cause the communication apparatus 102 to use the elapsed time (NO in step S507), the processing proceeds to step S509. In step S509, the communication apparatus 101 transmits a reproduction instructing not including the information for giving an instruction to use the elapsed time to the communication apparatus 102. Like step S508, the content that the communication apparatus 102 is instructed to reproduce are the same as the content that the communication apparatus 101 is reproducing at this step. To transmit the reproduction instruction, the communication apparatus 101 may use an RTSP SET_PARAMETER message.

The reproduction instruction transmitted to the communication apparatus 102 in step S508 or S509 includes relevant information about the content. Examples of the relevant information about the content include an identifier for identifying the content stored in the cloud server 104, a service name for identifying the service to be used to reproduce the content, and location information (URL or URI) about the content. The relevant information about the content to be transmitted by the communication apparatus 101 may be part of such information.

The reproduction instruction transmitted in step S508 or S509 and the reproduction position obtained in step S506 are included in the same message. In step S508 or S509, the communication apparatus 101 transmits the message including the reproduction instruction and the reproduction position to the communication apparatus 102. A message refers to data generated by the application that the communication apparatus 101 is using.

In step S603, the communication apparatus 102 receives the reproduction instruction for the content from the communication apparatus 101. In step S604, the communication apparatus 102 starts to measure the elapsed time.

In step S605, the communication apparatus 102 performs reproduction preparation for the content, based on the received reproduction instruction. Specifically, as the reproduction preparation for the content, for example, the communication apparatus 102 activates an application, initializes at least either one of an image decoder and an audio decoder, and performs processing for login authentication on the website or service providing the content. Based on the received relevant information about the content, the communication apparatus 102 may check the website or service providing the content to see whether the content is available.

In step S606, after the reproduction preparation for the content, the communication apparatus 102 stops measuring the elapsed time and transmits a response indicating completion or an error of the reproduction preparation to the communication apparatus 101 as a response to the reproduction instruction for the content. The response here is transmitted, for example, by using an RTSP response message, such as an RTSP OK and an RTSP NG that are responses to the received RTSP SET_PARAMETER message. The type of response to be transmitted by the communication apparatus 102 in step S606 is determined based on the result of the reproduction preparation for the content in step S605. If no error occurs during the reproduction preparation for the content in step S605, the communication apparatus 102 transmits an RTSP OK as the response. Meanwhile, if, for example, the application fails to be activated, at least either one of the image decoder and the audio decoder fails to be initialized, or the login authentication on the website or service providing the content fails, then the communication apparatus 102 transmits an RTSP NG as the response. Also, if the communication apparatus 102 checks the website or service providing the content to see whether the content is available and the content is found to be not available, the communication apparatus 102 transmits an RTSP NG as the response. If the communication apparatus 102 transmits an RTSP NG as the response, the communication apparatus 102 may transmit a message including the reason for the RTSP NG to the communication apparatus 101 as the response.

In step S510, the communication apparatus 101 receives the response to the reproduction instruction for the content from the communication apparatus 102.

In steps S511 and S607, the communication apparatuses 101 and 102 each determine whether the response transmitted by the communication apparatus 102 in step S606 is one indicating OK (OK response). If the message transmitted by the communication apparatus 102 as a response to the reproduction instruction for the content is not an OK response (NO in step S511 and NO in step S607), the processing proceeds to step S502 and step S406 of FIG. 4, respectively.

Meanwhile, if the communication apparatus 102 determines that the message transmitted by the communication apparatus 102 as a response to the reproduction instruction for the content is an OK response (YES in step S607), the processing proceeds to step S608. In step S608, the communication apparatus 102 suspends the mirroring with the communication apparatus 101. Similarly, if the communication apparatus 101 determines that the message transmitted by the communication apparatus 102 as a response to the reproduction instruction is an OK response (YES in step S511), the processing proceeds to step S512. In step S512, the communication apparatus 101 suspends the mirroring with the communication apparatus 102. Here, the communication apparatus 101 can stop the obtaining of the content from the cloud server 104 and the reproduction of the content as well. Specifically, the communication apparatus 102 initially transmits a stop instruction to suspend mirroring to the communication apparatus 101. Receiving the stop instruction, the communication apparatus 101 suspends the mirroring and transmits a response to the stop instruction to the communication apparatus 102. The communication apparatus 102 may suspend the mirroring when transmitting the stop instruction to the communication apparatus 101. The communication apparatus 102 may suspend the mirroring when the response to the stop instruction is received from the communication apparatus 101. The communication apparatus 102 may transmit an RTSP PAUSE message as the stop instruction. The communication apparatus 101 may transmit a stop instruction, instead of the communication apparatus 102. The communication apparatus 101 may transmit a predetermined message to cause the communication apparatus 102 to transmit a stop instruction. The communication apparatus 102 may suspend the mirroring based on the fact that the reproduction preparation for the content is performed in step S605. In such a case, the communication apparatus 101 may suspend the mirroring in response to the receipt of the response to the reproduction instruction from the communication apparatus 102. Suspending the mirroring processing between the communication apparatuses 101 and 102 can reduce the processing load of the mirroring and suppress the power consumption.

In step S609, after the suspension of the mirroring with the communication apparatus 101, the communication apparatus 102 obtains the content from the cloud server 104. Here, the communication apparatus 102 can obtain only a portion of the content by obtaining the content based on the reproduction position received with the reproduction instruction. Specifically, the communication apparatus 102 can obtain only a required portion of the content by obtaining only the content at and after the reproduction position.

In step S610, after the obtaining of the content, the communication apparatus 102 determines whether to use the measured elapsed time in starting to reproduce the obtained content. The determination is performed based on whether the reproduction instruction received in step S603 includes the information indicating the use of the elapsed time. If the reproduction instruction received in step S603 includes the information indicating the use of the elapsed time, the communication apparatus 102 determines to use the elapsed time (YES in step S610). Meanwhile, if the reproduction instruction received in step S603 does not include the information indicating the use of the elapsed time, the communication apparatus 102 determines to not use the elapsed time (NO in step S610).

If the communication apparatus 102 determines to use the elapsed time (YES in step S610), the processing proceeds to step S611. In step S611, the communication apparatus 102 starts to reproduce the content at a reproduction start position taking into account the reproduction position received from the communication apparatus 101 and the measured elapsed time. For example, the reproduction start position in step S611 is "the reproduction position received from the communication apparatus 101+the elapsed time", while fine adjustments may be further performed like adding the time taken for communication when the communication apparatus 102 receives the reproduction instruction from the communication apparatus 101. For example, if the reproduction position received from the communication apparatus 101 indicates 2 minutes 10 seconds and the measured elapsed time is 30 seconds, the reproduction start position is 2 minutes 40 seconds. The communication apparatus 102 then reproduces the content from 2 minutes 40 seconds. When switching from mirroring to content redirection, the communication apparatus 102 can thus continue reproducing the content by content redirection from as far as where the content has been displayed by mirroring.

Meanwhile, if the communication apparatus 102 determines to not use the elapsed time (NO in step S610), the processing proceeds to step S612. In step S612, the communication apparatus 102 sets the reproduction position received from the communication apparatus 101 as the reproduction start position, and starts to reproduce the content.

In step S513, the communication apparatus 101 performs control based on input user operations and the state of content redirection notified from the communication apparatus 102. In step S613, the communication apparatus 102 similarly performs control based on the state of content redirection and the reproduction control information transmitted from the communication apparatus 101.

Specifically, during content redirection, the communication apparatus 101 transmits reproduction control information based on the input user operations to the communication apparatus 102. The communication apparatus 102 controls the reproduction of the content based on the received reproduction control information. For example, if the communication apparatus 102 is reproducing a content when the user inputs a user operation for issuing a suspension instruction to the communication apparatus 101, the communication apparatus 101 transmits reproduction control information for suspending the reproduction of the content to the communication apparatus 102. Receiving the reproduction control information, the communication apparatus 102 suspends the reproduction of the content. If the communication apparatuses 101 and 102 are performing content redirection, the user can thus control the reproduction of the content being reproduced on the communication apparatus 102 by using the communication apparatus 101 as a remote controller.

Aside from suspension (pause), the communication apparatus 101 may transmit reproduction control information including instructions for playback, stop, fast forward, rewind, and playback from a user-specified reproduction start position. The communication apparatus 101 may also transmit reproduction control information including instructions to start the reproduction of the next content, control volume level, control reproduction speed, control the presence or absence of subtitles, and change a language setting. The communication apparatus 101 can transmit reproduction control information including at least any one of the foregoing instructions.

When the communication apparatuses 101 and 102 are performing content redirection, the communication apparatus 102 notifies the communication apparatus 101 of the state of content redirection in the communication apparatus 102. As the state of content redirection, the communication apparatus 102 notifies the communication apparatus 101 of a reproduction state and obtaining state of the content, and an execution state of content redirection. The communication apparatus 101 performs control based on the state of content redirection notified from the communication apparatus 102. For example, in a case where the communication apparatus 102 notifies the communication apparatus 101 that the content has been reproduced up to the end as the reproduction state of the content, the communication apparatus 101 may transmit a reproduction instruction to reproduce a different content to the communication apparatus 102, or may end the content redirection. Similarly, the communication apparatus 102 performs control based on the state of content redirection in the own apparatus.

In step S514, the communication apparatus 101 determines whether to end the content redirection. If the user inputs a user operation indicating an end of content redirection, the communication apparatus 101 determines to end the content redirection (YES in step S514). Alternatively, the communication apparatus 101 may determine to end the content redirection, for example, based on the fact that the state of content redirection received from the communication apparatus 102 indicates a stop or an error. Meanwhile, if the user does not input a user operation indicating an end of content redirection, the communication apparatus 101 determines to not end the content redirection (NO in step S514). The communication apparatus 101 may determine to not end the content redirection based on the fact that the state of content redirection received from the communication apparatus 102 does not indicate a predetermined state.

If the communication apparatus 101 determines to not end the content redirection (NO in step S514), the processing returns to step S513. Meanwhile, if the communication apparatus 101 determines to end the content redirection (YES in step S514), the processing of the present flowchart ends.

In step S614, the communication apparatus 102 similarly determines whether to end the content redirection. If the user inputs a user operation indicating an end of content redirection, the communication apparatus 102 determines to end the content redirection (YES in step S614). Alternatively, the communication apparatus 102 may determine to end the content redirection based on the fact that the state of content redirection indicates a predetermined state. The communication apparatus 102 may determine to end the content redirection based on the fact that the reproduction control information received from the communication apparatus 101 indicates an end of content redirection. Meanwhile, if the user does not input a user operation indicating an end of content redirection, the communication apparatus 102 determines to not end the content redirection (NO in step S614). Alternatively, the communication apparatus 102 may determine to not end the content redirection based on the fact that the state of content redirection does not indicate a predetermined state. The communication apparatus 102 may determine to not end the content redirection based on the fact that the reproduction control information received from the communication apparatus 101 does not indicate an end of content redirection.

If the communication apparatus 102 determines to not end the content redirection (NO in step S614), the processing returns to step S613. Meanwhile, if the communication apparatus 102 determines to end the content redirection (YES in step S614), the processing of the present flowchart ends.

As described above, the flowcharts of FIGS. 5 and 6 illustrate the processing to be executed by the communication apparatuses 101 and 102 in performing content redirection. When starting content redirection, the communication apparatus 102 measures the elapsed time including the time taken for the reproduction preparation for the content. This can reduce a difference in the reproduction position, occurring between communication apparatuses 101 and 102. In switching from mirroring to content redirection, the user's sense of incongruity may be reduced by thus reducing the difference in the reproduction position between the two communication apparatuses 101 and 102.

In FIG. 6, the communication apparatus 102 obtains the content from the cloud server 104 in step S609. However, this is not restrictive. The communication apparatus 102 may obtain the content as a part of the reproduction preparation in step S609.

In FIG. 6, the communication apparatus 102 suspends mirroring in step S608. However, this is not restrictive. The communication apparatus 102 may suspend mirroring based on the completion of the reproduction preparation for the content in step S605. In such a case, if the determination in step S607 is YES, the communication apparatus 102 performs the processing of step S609. The communication apparatus 101 here performs the processing of step S508 or S509, and then performs the suspension of mirroring of step S512, followed by the processing of step S510.

In FIG. 5, the communication apparatus 101 transmits the reproduction position of the content along with the reproduction instruction for the content in step S508 or S509. However, this is not restrictive. The communication apparatus 101 may transmit the reproduction position to the communication apparatus 102 by using a message different from the reproduction instruction. The communication apparatus 101 may transmit the reproduction position to the communication apparatus 102 at any timing between the transmission of the reproduction instruction in step S508 or S509 and the suspension of mirroring in step S512. In such a case, the communication apparatus 102 may start to measure the elapsed time in response to receipt of the reproduction position. Also, in a case where the communication apparatus 102 receives the reproduction position from the communication apparatus 101 after the measurement of the elapsed time is stopped, the communication apparatus 102 may set the received reproduction position as the reproduction start position and start to reproduce the content even if the elapsed time is determined to be used.

In step S507 of FIG. 5, the communication apparatus 101 determines whether to include the information indicating the use of the elapsed time by the communication apparatus 102 into the reproduction instruction for the content. However, this is not restrictive. In step S507, the communication apparatus 101 may determine whether to include information indicating no use of the elapsed time by the communication apparatus 102 into the reproduction instruction for the content. The determination is performed by using similar criteria to those of step S507 but with reversed results. In such a case, the communication apparatus 102 performs the determination of step S610 in FIG. 6 based on whether the information for disabling the use of the elapsed time is included in the received reproduction instruction.

In FIG. 5, the communication apparatus 101 starts reproducing the content in step S502. However, this is not restrictive. The communication apparatus 101 may skip step S502. In such a case, the communication apparatus 101 determines to not use the elapsed time in step S507. The communication apparatus 101 can thus determine to use the elapsed time if mirroring is switched to content redirection during reproduction of the content, and to not use the elapsed time if mirroring is switched to content redirection when the content is not being reproduced. Here, the communication apparatus 102 starts to reproduce the content based on the reproduction instruction either at the starting point of the content or, if the reproduction instruction includes information about a reproduction start position, at the reproduction start position.

In FIG. 6, the communication apparatus 102 performs the determination of step S610 based on whether the reproduction instruction includes the information indicating the use of the elapsed time. However, this is not restrictive. The communication apparatus 102 may perform the determination based on the reproduction position received along with the reproduction instruction. For example, if the communication apparatus 102 receives no reproduction position along with the reproduction instruction or if the reproduction position received along with the reproduction instruction indicates the starting point of the content, the communication apparatus 102 may determine to not use the elapsed time. Meanwhile, if the reproduction instruction received along with the reproduction position indicates a reproduction position other than the starting point of the content, the communication apparatus 102 may determine to use the elapsed time. If no reproduction position is received with the reproduction instruction, the communication apparatus 102 reproduces the content from the starting point.

In FIG. 6, the communication apparatus 102 performs the reproduction preparation for the content and then stops measuring the elapsed time in step S606. However, this is not restrictive. The communication apparatus 102 may measure the time until the mirroring is suspended in step S608. This can further reduce a difference in the reproduction position, occurring between the communication apparatuses 101 and 102. This can also shorten the portion of the content reproduced in an overlapping manner by the communication apparatuses 101 and 102. When the communication apparatus 102 starts reproducing the content by content redirection, the communication apparatus 102 can be prevented from redundantly reproducing part of the content already reproduced by mirroring.

Alternatively, the communication apparatus 102 may measure the time until the reproduction of the content is started in step S611. If the communication apparatus 101 continues reproducing the content even after the mirroring is suspended, the communication apparatus 102 can thus start to reproduce the content at the point as far as where the content has been reproduced by the communication apparatus 101.

In FIG. 6, the communication apparatus 102 measures the elapsed time from step S604 to step S606. However, this is not restrictive. The communication apparatus 102 may obtain times at steps S604 and S606, and calculate the elapsed time from the difference. Specifically, the communication apparatus 102 measures the times at step S604 and S606, and calculates the elapsed time by subtracting the time at step S604 from the time at step S606.

In FIG. 6, the communication apparatus 102 determines whether to use the elapsed time in step S610. However, the determination may be performed at any time after the receipt of the reproduction instruction in step S603. In such a case, after the processing of step S609, the communication apparatus 102 performs the processing of step S611 or S612 based on the result of determination of step S610. If the communication apparatus 102 performs the processing of step S610 before step S604 and determines to not use the elapsed time, the communication apparatus 102 does not need to measure the elapsed time. Specifically, the communication apparatus 102 may skip step S604 and skip the processing for stopping measurement of the elapsed time in step S605. If the communication apparatus 102 performs the processing of step S610 before step S609 and determines to use the elapsed time, the communication apparatus 102 may obtain the content in step S609 based on the reproduction position received with the reproduction instruction and the elapsed time. The communication apparatus 102 can thereby obtain only the required portion of the content.

According to the present exemplary embodiment, the communication apparatuses 101 and 102 are described to reproduce the same content. However, this is not restrictive. The communication apparatuses 101 and 102 may reproduce a corresponding content. Examples of the corresponding content include a content that needs to be reproduced somewhat synchronously with each other. In another example, the corresponding content refers to a content including respective pieces of image data having the same content but different resolutions or points of view. In yet another example, the corresponding content refer to a content including two-dimensional image data and a content including three-dimensional image data of the same content. If the content includes audio data, the corresponding content may refer to ones including audio data of respective different codecs or sampling frequencies.

According to the present exemplary embodiment, the communication apparatuses 101 and 102 start mirroring before content redirection. However, this is not restrictive. The communication apparatuses 101 and 102 may start content redirection without the intermediary of mirroring. The communication apparatus 101 starts processing at step S503 of FIG. 5. If the determination in step S503 is YES, the communication apparatus 101 performs the processing of steps S302 to S306 in FIG. 3, and performs the processing of step S504 and the subsequent steps in FIG. 5. Here, the communication apparatus 101 skips the processing of step S512. If the determination in step S503, S505, or S511 is NO, the processing returns to step S503. Similarly, the communication apparatus 102 starts processing at step S601 of FIG. 6. If the determination in step S601 is YES, the communication apparatus 102 performs the processing of steps S402 to S405 in FIG. 4, and performs the processing of step S602 and the subsequent steps in FIG. 6. Here, the communication apparatus 102 skips the processing of step S608. If the determination in step S601 or S607 is NO, the processing returns to step S601.

If content redirection is thus started without the intermediary of mirroring, the communication apparatus 101 may determine to not cause the communication apparatus 102 to use the elapsed time. Specifically, the communication apparatus 101 performs a determination of NO in step S507. Alternatively, after the processing of step S506, the communication apparatus 101 may skip the processing of step S507 and perform the processing of step S509. Similarly, the communication apparatus 102 may perform a determination of NO in step S610. Alternatively, after the processing of step S609, the communication apparatus 102 may skip the processing of step S610 and perform the processing of step S612. The communication apparatus 102 may skip the processing of step S604 and skip the processing for stopping measurement of the elapsed time in step S606.

At least part or all of the flowcharts of the communication apparatuses 101 and 102 illustrated in FIGS. 3 to 6 may be implemented by hardware. For hardware implementation, for example, dedicated circuits generated on a field programmable gate array (FPGA) from the computer programs for implementing the foregoing steps by using a predetermined complier may be used. Like an FPGA, a gate array circuit may be formed for hardware implementation. An application specific integrated circuit (ASIC) may be used for the implementation.

The steps of the flowcharts illustrated in FIGS. 3 to 6 may be performed by a not-illustrated plurality of CPUs or apparatuses in a distributed manner. In the case of distributed implementation with a plurality of apparatuses, the source device operates as a source system, and the sink device operates as a sink system.

For example, the communication apparatus 101 may be a source system including a reproduction apparatus that reproduces a content and a processing apparatus that performs processing such as transmission of wireless signals. In performing the mirroring processing in step S307 of FIG. 3, the processing apparatus may perform encoding, multiplexing, and data transmission processing of sound being reproduced by the reproduction apparatus in addition to or instead of processing on the captured image of the screen being displayed by the reproduction apparatus. In step S506 of FIG. 5, the processing apparatus may obtain the reproduction position of the content being reproduced by the reproduction apparatus. If the communication apparatus 101 is a source system including a plurality of apparatuses, which apparatus performs the processing of which step in FIGS. 3 and 5 is not limited thereto.

Similarly, the communication apparatus 102 may be a sink system including a reproduction apparatus that reproduces a content and a processing apparatus that performs processing, such as transmission of wireless signals. In performing the mirroring processing in step S406 of FIG. 4, the reproduction apparatus may perform reproduction processing on the captured image that is received from the communication apparatus 101 and decoded. If audio data is received instead of or in addition to the captured image, the reproduction apparatus may perform reproduction processing on the audio data decoded. In step S611 of FIG. 6, the processing apparatus may perform control in such a manner that the reproduction apparatus reproduces the content from the reproduction start position based on the reproduction start position received from the communication apparatus 101 and the elapsed time. If the communication apparatus 102 is a sink system including a plurality of apparatuses, which apparatus performs the processing of which step in FIGS. 4 and 6 is not limited thereto.

While the exemplary embodiment has been described in detail above, an exemplary embodiment of the present invention may be implemented, for example, as a system, an apparatus, a method, a program, and/or a recording medium (storage medium). Specifically, an exemplary embodiment of the present invention may be applied to a system including a plurality of devices (for example, a host computer, an interface device, an imaging apparatus, and a web application). An exemplary embodiment of the present invention may be applied to an apparatus including a single device.

An exemplary embodiment of the present invention may be implemented by processing for supplying a program for implementing one or more functions of the foregoing exemplary embodiments to a system or an apparatus via a network or a storage medium, and reading and executing the program by one or more processors of a computer of the system or apparatus. A circuit for implementing one or more functions (for example, ASIC) may be used for the implementation.

According to an exemplary embodiment of the present invention, a difference in reproduction positions can be reduced between a communication apparatus that is reproducing a content stored in an external apparatus and a communication apparatus that receives a reproduction instruction for the content from the communication apparatus and reproduces the content.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-116884, filed Jun. 20, 2018, which is hereby incorporated by reference herein in its entirety.

What is claimed is:

1. A communication apparatus comprising:
   one or more processors; and
   one or more memories storing instructions that, when executed by the one or more processors, cause the communication apparatus to:
   receive, while another communication apparatus is reproducing a content stored in an external server, an instruction and information from the another communication apparatus, the instruction at least including a reproduction instruction for causing the communication apparatus to obtain the content from the external server and to reproduce the obtained content, and the information indicating a reproduction position of the content being reproduced by the another communication apparatus, wherein the instruction further includes another instruction in a case where a predetermined user setting has been set to the another communication apparatus, and the instruction does not include the another instruction in a case where the predetermined user setting has not been set to the another communication apparatus;

perform a reproduction preparation for the content, based on reception of the instruction; and perform a first control of reproducing of the content so that the reproducing of the content is started from a reproduction position at a subsequent time from the reproduction position indicated by the received information based on time taken for the reproduction preparation in a case where the another instruction is included in the received instruction, and perform a second control of the reproducing of the content so that the reproducing of the content is started from the reproduction position indicated by the received information without using the time taken for the reproduction preparation in a case where the another instruction is not included in the received instruction, wherein, the subsequent time is an elapsed time including time taken for reproduction preparation for the content when causing the another communication apparatus to start to reproduce the content by content redirection.

2. The communication apparatus according to claim 1, wherein the instruction and the information indicating the reproduction position are included in a single message.

3. The communication apparatus according to claim 1, wherein a second message including the information indicating the reproduction position is received after receipt of a first message including the instruction and before completion of the reproduction preparation, and wherein the reproducing of the content is started from a reproduction position at a subsequent time from the reproduction position indicated by the received information, based on time taken to complete the reproduction preparation from receipt of the second message.

4. The communication apparatus according to claim 1, wherein the communication apparatus is further caused by the stored instructions to:

receive data from the another communication apparatus that is reproducing the content, the data being based on at least either one of a screen display and sound reproduction performed by reproducing the content; and reproduce the received data in such a manner that at least either one of the screen display and the sound reproduction is shared with the another communication apparatus, wherein the instruction for causing the communication apparatus to obtain the content from the external server and to reproduce the content is received while the data is being reproduced.

5. The communication apparatus according to claim 4, wherein the communication apparatus is further caused by the stored instructions to:

stop, after the reproduction preparation is performed, reproduction of the data, wherein, after the reproduction of the data is stopped, reproducing of the content is controlled to be started from a reproduction position at a subsequent time from the reproduction position indicated by the received information, based on a time period from receipt of the information indicating the reproduction position to the stop of the reproduction of the data.

6. The communication apparatus according to claim 5, wherein the communication apparatus is further caused by the stored instructions to: transmit a stop instruction for instructing the another communication apparatus to stop transmitting the data, based on the stop of the reproduction of the data.

7. The communication apparatus according to claim 4, wherein the data is received according to a method compliant with a Wi-Fi Miracast standard.

8. The communication apparatus according to claim 1, wherein the reproduction preparation is processing including activation of an application for reproducing the content.

9. The communication apparatus according to claim 1, wherein the reproduction preparation is processing including login on a website or service for reproducing the content.

10. The communication apparatus according to claim 1, wherein the reproduction preparation is processing including initialization of at least either one of an image decoder and an audio decoder.

11. The communication apparatus according to claim 1, wherein the reproduction preparation is processing including obtaining of the content from the external server.

12. The communication apparatus according to claim 1, wherein the instruction includes relevant information about the content.

13. The communication apparatus according to claim 12, wherein the relevant information is a Uniform Resource Identifier (URI) indicating a storage location of the content in the external server.

14. The communication apparatus according to claim 1, wherein image data included in the content reproduced by the another communication apparatus and image data included in the content reproduced by the communication apparatus have different resolutions.

15. The communication apparatus according to claim 1, wherein either one of image data included in the content reproduced by the another communication apparatus and image data included in the content reproduced by the communication apparatus is image data on a two-dimensional image, and the other is image data on a three-dimensional image.

16. The communication apparatus according to claim 1, wherein audio data included in the content reproduced by the another communication apparatus and audio data included in the content reproduced by the communication apparatus are of different codecs or sampling frequencies.

17. The communication apparatus according to claim 1, wherein the information indicating the reproduction position is expressed by time information indicating a beginning of the content as a starting point.

18. The communication apparatus according to claim 1, wherein the reproduction instruction and the information indicating the reproduction position are received according to a method compliant with a Wi-Fi Miracast standard.

19. A control method for controlling a communication apparatus, the method comprising:

receiving, while another apparatus is reproducing a content stored in an external server, an instruction and information from the another communication apparatus, the instruction at least including a reproduction instruction for causing the communication apparatus to obtain the content from the external server and to reproduce the obtained content, and the information indicating a reproduction position of the content being reproduced by the another communication apparatus, wherein the instruction further includes another instruction in a case where a predetermined user setting has been set to the another communication apparatus, and the instruction does not include the another instruction in a case where the predetermined user setting has not been set to the another communication apparatus;

performing a reproduction preparation for the content, based on reception of the instruction; and performing a first control of reproducing of the content so that the reproducing of the content is started from a reproduction position at a subsequent time from the reproduction position indicated by the received information based on time taken for the reproduction preparation in a case where the another instruction is included in the received instruction, and performing a second control of the reproducing of the content so that the reproducing of the content is started from the reproduction position indicated by the received information without using the time taken for the reproduction preparation in a case where the another instruction is not included in the received instruction, wherein, the subsequent time is an elapsed time including time taken for reproduction preparation for the content when causing the another communication apparatus to start to reproduce the content by content redirection.

20. A non-transitory computer-readable storage medium storing a computer program for causing a computer to execute a control method for controlling a communication apparatus, the control method comprising:

receiving, while another communication apparatus is reproducing a content stored in an external server, an instruction and information from the another communication apparatus, the instruction at least including a reproduction instruction for causing the communication apparatus to obtain the content from the external server and to reproduce the obtained content, and the information indicating a reproduction position of the content being reproduced by the another communication apparatus, wherein the instruction further includes another instruction in a case where a predetermined user setting has been set to the another communication apparatus, and the instruction does not include the another instruction in a case where the predetermined user setting has not been set to the another communication apparatus;

performing a reproduction preparation for the content, based on reception of the instruction; and performing a first control of reproducing of the content so that the reproducing of the content is started from a reproduction position at a subsequent time from the reproduction position indicated by the received information based on time taken for the reproduction preparation in a case where the another instruction is included in the received instruction, and performing a second control of the reproducing of the content so that the reproducing of the content is started from the reproducing position indicated by the received information without using the time taken for the reproduction preparation in a case where the another instruction is not included in the received instruction, wherein, the subsequent time is an elapsed time including time taken for reproduction preparation for the content when causing the another communication apparatus to start to reproduce the content by content redirection.

21. A communication system comprising a first communication apparatus and a second communication apparatus, wherein the first communication apparatus comprising:

one or more processors; and one or more memories storing instructions that, when executed by the one or more processors, cause the first communication apparatus to:

set a first setting based on a user operation;

transmit, in a case where the first setting is set and where the first communication apparatus receives a predetermined operation while reproducing a content stored in a server, a first instruction and information to the second communication apparatus, the first instruction including reproduction instruction for causing the second communication apparatus to obtain the content from the server and to reproduce the obtained content and another instruction to reproduce the content based on a time taken for a reproduction preparation, and the information indicating a reproduction position of the content being reproduced by the first communication apparatus; and transmit, in a case where the first setting is not set and where the first communication apparatus receives the predetermined operation while reproducing the content stored in the server, a second instruction including the reproduction instruction but not including the another instruction, and wherein the second communication apparatus comprising:

one or more processors; and one or more memories storing instructions that, when executed by the one or more processors, cause the second communication apparatus to:

perform the reproduction preparation for the content in response to receiving the first instruction or the second instruction;

perform, in a case where the first instruction has been received, a first control of reproducing of the content so that the reproducing of the content is started from a reproduction position at a subsequent time from the reproduction position indicated by the received information based on the time taken for the reproduction preparation, perform, in a case where the second instruction has been received, a second control of the reproducing of the content so that the reproducing of the content is started from the reproduction position indicated by the received information without using the time taken for the reproduction preparation, wherein, the subsequent time is an elapsed time including the time taken for the reproduction preparation for the content when causing the another communication apparatus to start to reproduce the content by content redirection.

22. A communication apparatus comprising:

one or more processors; and one or more memories storing instructions that, when executed by the one or more processors, cause the communication apparatus to:

set a first setting based on a user operation;

transmit, in a case where the first setting is set and where the first communication apparatus receives a predetermined operation while reproducing a content stored in a server, a first instruction and information to an external communication apparatus, the first instruction including reproduction instruction for causing the external communication apparatus to obtain the content from the server and to reproduce the obtained content and another instruction to reproduce the content based on a time taken for a reproduction preparation, and the information indicating a reproduction position of the content being reproduced by the first communication apparatus; and transmit, in a case where the first setting is not set and where the first communication apparatus receives the predetermined operation while reproducing the content stored in the server, a second instruction including the reproduction instruction but not including the another instruction to the external communication apparatus, wherein the content is reproduced from a reproduction position calculated from the reproduction position indicated by the received information with taking a time taken for the reproduction preparation into account in a case where the external apparatus has received the first instruction, and the content is reproduced from the reproduction position indicated by the received information in a case where the external apparatus has received the second instruction.

* * * * *